United States Patent [19]
Reimers

[11] Patent Number: 5,919,604
[45] Date of Patent: Jul. 6, 1999

[54] RUBBER-BASED AQUEOUS DEVELOPABLE PHOTOPOLYMERS AND PHOTOCURABLE ELEMENTS COMPRISING SAME

[75] Inventor: Jay L. Reimers, Atlanta, Ga.

[73] Assignee: Polyfibron Technologies, Inc., Atlanta, Ga.

[21] Appl. No.: 08/902,837

[22] Filed: Jul. 30, 1997

[51] Int. Cl.$^6$ .................................................. G03F 7/033
[52] U.S. Cl. ................... 430/283.1; 430/286.1; 430/287.1; 525/279; 525/280; 525/284; 522/116; 522/120; 522/121; 522/122
[58] Field of Search .................................... 525/279, 280, 525/284; 430/286.1, 287.1, 283.1; 522/116, 120, 121, 122

[56] References Cited

U.S. PATENT DOCUMENTS

| | | | |
|---|---|---|---|
| 3,494,981 | 2/1970 | Thorpe | 260/876 |
| 3,847,609 | 11/1974 | Breslow et al. | 96/33 |
| 4,070,259 | 1/1978 | De Poorter et al. | 204/159.16 |
| 4,163,763 | 8/1979 | Tsuchiya et al. | 525/290 |

OTHER PUBLICATIONS

Sauer and Wiest, "Diels–Alder Additions with "Inverse" Electron Demand", *Angew. Chem. Int. Ed. Engl.*, 1962, 1, 269.

Bradsher and Stone, "The Nature of the Addition of Dienophiles to the Acridizinium Ion", *J. Org. Chem.*, 1968, 33(2), 519–523.

Bradsher and Stone, "Addition of Dienophiles to the Acridizinium Ion. III. Evidence for a Two–Step Reaction", *J. Org. Chem.*, 1969, 34(6), 1700–1702.

*Primary Examiner*—Cynthia Hamilton
*Attorney, Agent, or Firm*—Woodcock Washburn Kurtz Mackiewicz & Norris, LLP

[57] ABSTRACT

Photocurable compositions and methods for making same are provided. The compositions comprise at least one ethylenically unsaturated monomer, at least one photoinitiator, and at least one water dispersible ethylenically unsaturated rubber. The ethylenically unsaturated rubber is rendered water dispersible by reaction of olefinic functionality therein with a hydrophilic diene. The resulting water-dispersible ethylenically unsaturated rubber is then blended with one or more ethylenically unsaturated monomers and one or more photoinitiators.

23 Claims, 1 Drawing Sheet

RUBBER-BASED AQUEOUS DEVELOPABLE PHOTOPOLYMERS AND PHOTOCURABLE ELEMENTS COMPRISING SAME

FIELD OF THE INVENTION

The present invention is directed to rubber-based, aqueous developable photopolymers, to synthetic techniques for preparing such photopolymers, and to the use of such photopolymers in photocurable elements.

BACKGROUND OF THE INVENTION

Photocurable compositions are used in forming printing plates and other photosensitive articles. In the field of photosensitive flexographic printing plates, the uncured plate typically includes a support and a photocurable surface or layer. Additional layers or surfaces on the plate can include, for example, slip films and/or release layers to protect the photocurable surface. Prior to processing the plate, the release layer typically is removed, and the photocurable layer is exposed to radiation in an imagewise fashion. Unexposed areas of the photocurable layer are then removed in developer baths.

In the past, unexposed areas of the photocurable layer were removed using developer baths comprising organic solvents. However, the toxicity, volatility, and low flash point of such solvents give rise to hazardous conditions and pollution problems. As a result, there has been a recognition of the need to provide photocurable composition which can be developed in, for example, aqueous solvents.

A flexographic printing plate not only should possess a photocurable layer, but also should have sufficient flexibility to wrap around a printing cylinder and sufficient structural integrity to withstand the rigors experienced during typical printing processes. The printing plate should also be soft enough to facilitate ink transfer during printing, and should exhibit solvent resistance to inks, including resistance to the various organic and aqueous-based inks which are used in flexographic printing.

Many of the aqueous developable compositions reported to date have not possessed a sufficient balance of these desired properties. Consequently, there remains a need for photocurable polymers which can be dispersed in aqueous solvents and exhibit an appropriate balance of the other properties required for the production of flexographic printing plates. The present invention is directed to these and other important ends.

SUMMARY OF THE INVENTION

In one aspect, the present invention provides photocurable compositions and methods for making same. In general, the compositions comprise at least one ethylenically unsaturated monomer, at least one photoinitiator, and at least one water dispersible ethylenically unsaturated rubber. The ethylenically unsaturated rubber is rendered water dispersible by reaction of olefinic functionality therein with a hydrophilic diene. The resulting water-dispersible ethylenically unsaturated rubber is then blended with one or more ethylenically unsaturated monomers and one or more photoinitiators.

The present invention also provides photocurable elements which include a support layer and, on the support layer, a water-dispersible photocurable composition comprising a water dispersible ethylenically unsaturated rubber, at least one ethylenically unsaturated monomers, and at least one photoinitiator.

BRIEF DESCRIPTION OF THE DRAWINGS

The numerous objects and advantages of the present invention may be better understood by those skilled in the art by reference to the accompanying non-scale FIGURE, in which.

DETAILED DESCRIPTION OF THE INVENTION

Figure 1:
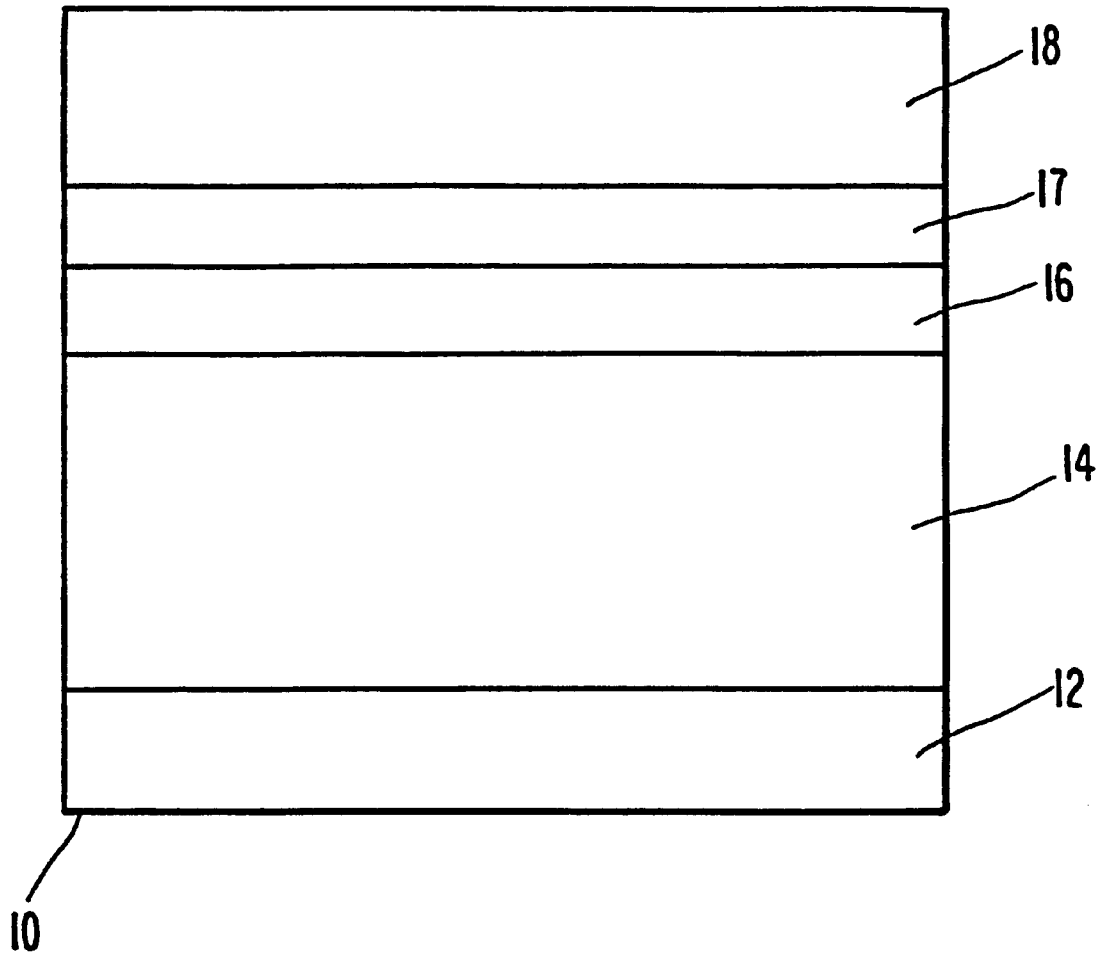
FIG. 1 is a cross-sectional view of a photocurable element according to the invention.

The photocurable compositions of the present invention are aqueous developable and water-dispersible. Water-dispersibility is achieved principally by the use of an ethylenically unsaturated rubber which has been chemically modified through reaction with a diene having a hydrophilic moiety which becomes incorporated into the rubber. The reaction product is also referred to herein as a water-dispersible ethylenically unsaturated rubber.

Suitable ethylenically unsaturated rubbers for use in the present invention include polyisoprene, elastomeric terpolymers of ethylene, propylene and diene monomers (EPDM), neoprenes, isobutylene/isoprene copolymers, rubbers derived from butadiene including styrene-butadiene rubber (SBR), and nitrile rubbers.

Preferred dienes are those having hydrophilic groups which are anionic (i.e., bear a negative charge or have substantial anionic character due, for example, to the electron-withdrawing nature of constituent atoms). Preferred anionic hydrophilic groups contain a $C=O$, $S=O$, $P=O$, OH, and/or amine group. The diene can be a cyclic or a 1,3-cis linear diene. Exemplary cyclic dienes suitable for use in the present invention include substituted pyrroles, furans, thiophenes, and carbocycles. Particularly preferred dienes include carboxy furans, amino furans, and alkyl pyrroles.

The reaction between the rubber and the diene can be carried out using methods known to those skilled in the art, such as, for example, mixing, rotomixing, or extrusion. Typically, the reaction is carried out at a temperature that is within about 20 degrees of the rubber's $T_g$. Although it is not intended that the present invention be bound by any particular theory, it is believed that the rubber and the diene undergo a Diels-Alder cyclization reaction. As known to those skilled in the art, a Diels-Alder reaction is a cycloaddition reaction in which a diene and an unsaturated dienophile react to form a six-membered ring. The present cyclization reactions can be viewed as "inverse" Diels-Alder reactions in that the dienes employed are relatively electron-rich.

Following the reaction of the rubber with the diene, one or more monomers are added. The monomers preferably produce salts upon treatment with base, thereby increasing the solubility in water of materials into which the monomers are incorporated. If more than one monomer is added, the monomers are preferably added sequentially. Monomers for use in the present invention may be monofunctional or polyfunctional, and include, for example, alkyl acrylates and alkyl methacrylates; N-alkylacrylamide, N,N-dialkyl amino monoalkyl(meth)acrylates, N-alkyl amino alkyl (meth) acrylate, N,N,N-trialkyl amino alkyl (meth)acrylates, and cationic salts thereof; unsaturated monocarboxylic acids; unsaturated polycarboxylic acids and anhydrides; unsaturated substituted and unsubstituted esters and amides of carboxylic acids and anhydrides; nitriles; vinyl monomers; vinylidene monomers; monoolefinic and polyolefinic monomers; and unsaturated heterocyclic monomers. "Alkyl," as used herein, refers to hydrocarbon chains having from 1 to about 30 carbon atoms, preferably up to about 18 carbon atoms, more preferably up to about 10 carbon atoms, even more preferably up to about 8 carbon atoms, and most preferably up to about 6 carbon atoms.

Exemplary monofunctional monomers include alkyl acrylates and alkyl methacrylates, monomers containing carboxylic acid groups, monomers containing hydroxyl groups, aliphatic conjugated diene monomers, polymerizable amides, vinyl ethers, vinyl esters, styrenes, vinyl ketones, olefins, polymerizable nitriles, and monomers having sulfonic or phosphoric groups. Particular examples of suitable alkyl acrylates and methacrylates, also referred to herein collectively as (meth)acrylates, include methyl (meth) acrylate, ethyl (meth)acrylate, n-butyl (meth)acrylate, propyl (meth)acrylate, 2-ethyl-hexyl (meth)acrylate, lauryl (meth)acrylate, stearyl (meth)acrylate, acyl (meth)acrylate, cyclohexyl (meth)acrylate, dimethylaminoethyl (meth) acrylate. Other useful acrylates include octyl acrylate and 2-chloroethyl acrylate. Particular examples of aliphatic conjugated diene monomers include 1,3-butadiene, isoprene, dimethybutadiene, 1,3-pentadiene, and chloroprene. Exemplary carboxylic acid group-containing monomers include acrylic acid, methacrylic acid, maleic acid, fumaric acid, tetracosanoic acid, and crotonic acid. Anhydrides include maleic anhydride. Exemplary hydroxyl group-containing monomers include 2-hydroxyethyl (meth)acrylate, hydroxypropyl (meth)acrylate, hydroxybutyl (meth)acrylate, allyl alcohol, methallyl alcohol, N-(4-hydroxyphenyl) acrylamide, N-(4-hydroxyphenyl)methacrylamide, o-hydroxystyrene, m-hydroxystyerene, p-hydroxystyrene, and o-, m-, or p-hydroxyphenyl (meth)acrylate. Exemplary polymerizable amides include acrylamide, methacrylamide, N-methylolacrylamide, N-ethylacrylamide, N-hexylacrylamide, N-cyclohexylacrylamide, N-hydroxyethylacrylamide, N-phenylacrylamide, N-nitrophenylacrylamide, and N-ethyl-phenylacrylamide. Exemplary vinyl ethers include ethyl vinyl ether, 2-chloroethyl vinyl ether, hydroxyethyl vinyl ether, propyl vinyl ether, butyl vinyl ether, butyl vinyl ether, octyl vinyl ether, and phenyl vinyl ether. Exemplary styrenes include styrene, α-methyl styrene, methylstyrene, and chloromethylstyrene. Exemplary vinyl ketones include methyl vinyl ketone, ethyl vinyl ketone, propyl vinyl ketone, and phenyl vinyl ketone. Exemplary olefins include ethylene, propylene, isobutylene, and glycidyl(meth)acrylate. Exemplary polymerizable nitriles include acrylonitrile, methacrylonitrile, N-vinylpyrrolidone, N-vinylcarbazole, and 4-vinylpyridine. Exemplary monomers having sulfonic or phosphonic groups include vinylsulfonic acid, styrene-p-sulfonic acid, 2-sulfoxyethyl methacrylate, and 2-acrylamide-2-methylpropanesulfonic acid.

Polyfunctional monomers have more than one potential polymerization site, and can therefore become incorporated within more than one polymer chain and thus facilitate crosslinking between the polymer chains. Polyfunctional monomers include polyethylenically unsaturated monomers in which the ethylenically unsaturated groups preferably have approximately equal reactivity, such as divinyl benzene, polyethylenically unsaturated monomers in which the ethylenically unsaturated groups have different reactivities, and ethylenically unsaturated monomers containing carboxyl groups or epoxy groups.

Polyfunctional alkyl acrylates and alkyl methacrylates useful in the present invention include trimethylolpropane di(meth)acrylate, trimethylolpropane di(meth)acrylate, ethylene glycol di(meth)acrylate, pentaerythritol tri(meth) acrylate, pentaerythritol tetra(meth)acrylate, 1,4-butanediol di(meth)acrylate, 1,6-hexanediol di(meth)acrylate, triethylene glycol di(meth)acrylate, tetraethylene glycol di(meth) acrylate, polyethylene glycol di(meth)acrylate, pentaerythritol di(meth)acrylate, glycerol dimethacrylate, glycerolallyloxy di(meth)acrylate, 1,1,1-trishydroxymethylethane di(meth)acrylate, 1,1,1-trishydroxymethylethane tri(meth)acrylate, 1,1,1-trishydroxymethylpropane di(meth)acrylate, 1,1,1-trishydroxymethylpropane tri(meth)acrylate, triallyl cyanurate, triallyl isocyanurate, glycidyl (meth)acrylate, allyl methacrylate, diallyl maleate, allyl acryloxy propionate, triallyl cyanurate, triallyl isocyanurate, diallyl terephthalate, diallyphthalate, acrylic acid, methacrylic acid, crotonic acid, itaconic acid, and citraconic acid.

Other monomers suitable for forming the crosslinked polymer will be readily apparent to one skilled in the art once armed with the present disclosure.

Following the addition of the ethylenically unsaturated monomer to the rubber, a photoinitiator is added, as well as any optional additives. The additives which can be used are well known to those skilled in the art, including antioxidants, fillers, binders, and plasticizers. Suitable photoinitiators include polymerization initiators which are activated by actinic radiation, generally ultraviolet or visible radiation. As used herein, "actinic" radiation is radiation which is capable of effecting a chemical change in an exposed portion of the composition. Actinic radiation includes, for example, amplified (e.g., laser) and non-amplified light, particularly in the ultraviolet and infrared wavelength regions. Actinic radiation for use in the present invention preferably is in the wavelength region from about 250 nm to about 450 nm, more preferably from about 300 nm to about 400 nm, and most preferably from about 320 nm to about 380 nm.

Photoinitiators for use in the present invention can be soluble or insoluble in aqueous media. Exemplary suitable photoinitiators include benzophenones (e.g., p-aminobenzophenone), acetophenones (e.g., 2,2-dimethoxy-2-phenylacetophenone), anthraquinones (e.g., 9,10-anthraquinone, 1-chloroanthroquinone, 2-chloroanthraquinone), xanthones, and benzoin ethers.

The photocurable compositions of the invention can be prepared by blending from about 2 percent to about 30 percent by weight (preferably from about 8 percent to about 15 percent by weight) of the ethylenically unsaturated monomer, from about 0.25 percent to about 2 percent by weight (preferably from about 0.5 percent to about 1.5 percent by weight) of the photoinitiator, and from 60 percent to about 98 percent by weight (preferably from about 85 percent to about 92 percent by weight) of the water-dispersible ethylenically unsaturated rubber, based on the total composition. The water-dispersible ethylenically unsaturated rubber, in turn, is formed by reacting from about 6 percent to about 20 percent by weight (preferably from about 8 percent to about 12 percent by weight) of the diene with from 80 percent to about 94 percent by weight (preferably from about 88 percent to about 92 percent by weight) of the ethylenically unsaturated rubber, based on the reaction product. The optional additives can be constitute from about 2 to about 30 percent of the photocurable compositions.

The photocurable compositions of the present invention are useful in forming photocurable elements. A photocurable element is generally formed by placing a layer of the photocurable composition 14 onto a suitable support, or backing, layer 12, as shown in FIG. 1. The support layer can be formed from a transparent or opaque material such as paper, cellulose film, plastic, rubber, or metal. In preferred embodiments, the support layer is formed of polyethylene terephthalate film having a thickness of about 0.005 inch.

The thickness of the photocurable layer can vary, but is generally from about 0.02 to about 0.35 inch. If necessary, an adhesive may be applied to the support material.

A photocurable element according to the present invention can be, for example, in the form of a cylinder or a rectilinear sheet or plate. If desired, a photocurable element can further comprise a second layer of photocurable material, a cover sheet, and a protective layer. If a second photocurable layer is used, it is typically disposed upon the first and is similar in composition but considerably thinner, generally less than about 0.01 inch. The protective layer, if used, is typically from about 0.001 to about 0.01 inch thick. The protective layer protects the photocurable element from contamination, increases ease of handling, and acts as an ink-accepting layer. The cover sheet, if used, forms the final layer and cam be formed from any suitable material which protects the element from damage until ready for use. As will be recognized by one skilled in the art, exposure of the photocurable composition to actinic radiation should be avoided prior to development of the photocurable element into which the composition is incorporated.

In a typical developing process, a plate formed from a composition of the present invention is exposed to actinic radiation through a negative and polymerized at the light-exposed portions to form latent images. The exposed plate is then rinsed with water to yield relief images, dried and then post-exposed to radiation to form a flexographic printing plate.

The following examples are merely illustrative of the present invention and should not be considered limiting of the scope of the invention in any way. These examples and equivalents thereof will become more apparent to those skilled in the art in light of the present disclosure and the accompanying claims.

Example 1

In a Haake rotomixer, 200 grams (g) of polyisoprene (Mol. wt. 800,000; 97% cis; from Aldrich Chemical Co.) and 22.2 g of 2-carboxyfuran were reacted at 132° C. for 30 minutes. After cooling to 60° C., 36.7 g of diethylaminoethyl methacrylate (from CPS Chemical) and 23.2 g of 1,6-hexanediol diacrylate (from Sartomer) were added, followed by 5.8 g of Irgacure 651 photoinitiator (from Ciba Geigy) and 2.9 g of butylated hydroxytoluene.

A printing plate was formed from the mixture according to the following procedure. A layer of approximately 0.067 inch thickness was spread upon a polyethylene terephthalate support. The layer was then exposed to UVA radiation (within the wavelength region of about 350–400 nm) through a negative for about six minutes. Exposed portions hardened, while unexposed portions did not. The negative was removed and the plate was washed with 2 weight percent $Na_2CO_3$. The printing plate was clear, and had a wash rate of 2.6 mil/min in 2% $Na_2CO_3$ and 2% RW140 at 145° F. Resilience was >50% and Shore A durometer was 46.

Example 2

In a Haake rotomixer, 200 g of polyisoprene and 22.2 g of 1-methyl pyrrole (from Aldrich) were reacted at 120° C. for 30 minutes. After cooling to 60° C., 23.6 g of methacrylic acid (from Huls America) and 23.2 g of 1,6-hexanediol diacrylate (from Sartomer) were added, followed by 5.8 g of Irgacure 651 photoinitiator and 2.9 g of butylated hydroxytoluene. A printing plate was formed from the mixture as in Example 1. The printing plate was clear, and had a wash rate of 2.2 mil/min in 2% $Na_2CO_3$ and 2% RW140 at 145° F. Resilience was >50% and softness 50 Shore A.

Example 3

Two hundred grams of polyisoprene/polystyrene tri-block (Kraton D1107, Shell Chemical) and 22.2 g of dimethylaminomethyfurfuryl alcohol hydrochloride (Aldrich) were reacted in a Haake rotomixier at 132° C. for 0.5 hours. The reaction mixture was then cooled to 60° C. The monomers dimethylaminopropyl methacrylamide (39.5 g, Aldrich) and 1,6-hexanediol diacrylate (20.4 g, Sartomer) were then added. Irgacure 651 photoinitiator (5.8 g, Ciba-Geigy) and butylated hydroxytoluene (2.9 g) were also added. A printing plate was formed from the mixture as in Example 1. The resulting plate was clear, resilient (>50%), soft (46 Shore A), and had a wash rate of 2.0 mil/min in 2% lactic acid at 145° F.

Various modifications of the invention, in addition to those described herein, will be apparent to those skilled in the art from the foregoing description. Such modifications are intended to fall within the scope of the appended claims.

What is claimed is:

1. A photocurable composition comprising:
   at least one ethylenically unsaturated monomer;
   at least one photoinitiater; and
   the reaction product formed by reacting an ethylenically unsaturated rubber with a diene comprising at least one hydrophilic moiety that is a C=O, S=O, P=O, OH, or amine group.

2. The composition of claim 1 wherein said ethylenically unsaturated rubber is selected from the group consisting of polyisoprene, neoprenes, isobutylene/isoprene copolymers, rubbers derived from butadiene, nitrile rubbers, and elastomeric terpolymers of ethylene, propylene, and diene monomers.

3. The composition of claim 1 wherein said ethylenically unsaturated monomer is selected from the group consisting of alkyl acrylates and alkyl methacrylates; N-alkylacrylamide, N,N-dialkyl amino monoalkyl(meth)acrylates, N-alkyl amino alkyl (meth)acrylate, N,N,N-trialkyl amino alkyl (meth)acrylates, and cationic salts thereof; unsaturated monocarboxylic acids; unsaturated polycarboxylic acids and anhydrides; nitriles; vinyl monomers; vinylidene monomers; monoolefinic and polyolefinic monomers; and unsaturated heterocyclic monomers.

4. The composition of claim 1 wherein said ethylenically unsaturated monomer constitutes from about 2 percent to about 30 percent by weight of said composition.

5. The composition of claim 1 wherein said hydrophilic moiety is anionic.

6. The composition of claim 1 wherein said diene is cyclic.

7. The composition of claim 1 wherein said diene is a furan, thiophene, pyrrole, or carbocycle.

8. The composition of claim 1 wherein said diene is a carboxy furan, an amino furan, or an alkyl pyrrole.

9. The composition of claim 1 wherein said reaction product constitutes from about 60 percent to about 98 percent by weight of said composition.

10. A photocurable element comprising a support layer and a photocurable composition according to claim 1 disposed upon said support layer.

11. A synthetic method comprising reacting an ethylenically unsaturated rubber with a diene comprising at least one hydrophilic moiety that is a C=O, S=O, P=O, OH, or amine group.

12. The method of claim 11 wherein said ethylenically unsaturated rubber is selected from the group consisting of polyisoprene, neoprenes, isobutylene/isoprene copolymers, rubbers derived from butadiene, nitrile rubbers; and elastomeric terpolymers of ethylene, propylene and diene monomers.

13. The method of claim 11 wherein said hydrophilic moiety is anionic.

14. The method of claim 11 wherein said diene is cyclic.

15. The method of claim 11 wherein said diene is a furan, thiophene, pyrrole, or carbocycle.

16. The method of claim 11 wherein said diene is a carboxy furan, an amino furan, or an alkyl pyrrole.

17. A method for forming a water-dispersible photocurable composition comprising:

providing an ethylenically unsaturated rubber;

reacting said rubber with a diene comprising at least one hydrophilic moiety that is a C=O, S=O, P=O, OH or amine group, thereby forming a water-dispersible ethylenically unsaturated rubber; and mixing said water-dispersible ethylenically unsaturated rubber with at least one ethylenically unsaturated monomer and at least one photoinitiator.

18. The method of claim 17 wherein said ethylenically unsaturated rubber is selected from the group consisting of polyisoprene, neoprenes, isobutylene/isoprene copolymers, rubbers derived from butadiene, nitrile rubbers, and elastomeric terpolymers of ethylene, propylene and diene monomers.

19. The method of claim 17 wherein said hydrophilic moiety is anionic.

20. The method of claim 17 wherein said diene is cyclic.

21. The method of claim 17 wherein said diene is a furan, thiophene, pyrrole, or carbocycle.

22. The method of claim 17 wherein said diene is a carboxy furan, an amino furan, or an alkyl pyrrole.

23. The composition of claim 17 wherein said ethylenically unsaturated monomer is selected from the group consisting of alkyl acrylates and alkyl methacrylates; N-alkylacrylamide, N,N-dialkyl amino monoalkyl(meth)acrylates, N-alkyl amino alkyl (meth)acrylate, N,N,N-trialkyl amino alkyl (meth)acrylates, and cationic salts thereof; unsaturated monocarboxylic acids; unsaturated polycarboxylic acids and anhydrides; nitriles; vinyl monomers; vinylidene monomers; monoolefinic and polyolefinic monomers; and unsaturated heterocyclic monomers.

* * * * *